United States Patent [19]

Wightman

[11] Patent Number: 4,614,280
[45] Date of Patent: Sep. 30, 1986

[54] CUP AND APPARATUS AND METHOD FOR MAKING IT

[76] Inventor: Lawrance W. Wightman, 3 Ridgecreek, St. Louis, Mo. 63141

[21] Appl. No.: 639,679

[22] Filed: Aug. 9, 1984

Related U.S. Application Data

[63] Continuation of Ser. No. 415,396, Sep. 7, 1982, abandoned.

[51] Int. Cl.[4] .............................................. B65D 6/34
[52] U.S. Cl. ....................................... 220/67; 220/66; 220/69
[58] Field of Search ....................... 220/69, 66, 67, 201

[56] References Cited

U.S. PATENT DOCUMENTS

| | | | |
|---|---|---|---|
| 1,959,262 | 5/1934 | Colabrese | 220/69 |
| 2,086,404 | 7/1937 | Daniels | 220/69 |
| 2,394,319 | 2/1946 | McDonald | 220/69 |
| 2,656,163 | 10/1953 | Schwarz | 220/69 |
| 2,767,899 | 10/1956 | Brown | 220/66 |
| 2,813,509 | 11/1957 | Bruno | 220/69 |
| 2,872,560 | 2/1959 | Bowles | 220/69 |
| 3,482,731 | 12/1969 | Douty | 220/69 |
| 3,590,988 | 7/1971 | Hollar | 220/69 |
| 4,346,832 | 8/1982 | Werner | 220/69 |

*Primary Examiner*—Joseph Man-Fu Moy
*Attorney, Agent, or Firm*—Polster, Polster and Lucchesi

[57] ABSTRACT

A cup with a plastic body has a base part defining a central opening and a radially outwardly extending flange around the base part and a continuous rib projecting in a generally axially direction from the lower surface of the flange, and a metal base closure of a metal having a different coefficient of expansion from the plastic body. An annular gasket between the closure and the lower surface of the flange is in continuous engagement with the flange rib. The closure has a rim that is staked over the flange a distance greater than any anticipated distance of contraction or expansion of the flange upon repeated cycling of heating and cooling. An apparatus for making the cup includes a cup-supporting platform, staking arms pivotally mounted at generally equispaced stations around the platform and a cam mounted to actuate the arm substantially simultaneously.

7 Claims, 13 Drawing Figures

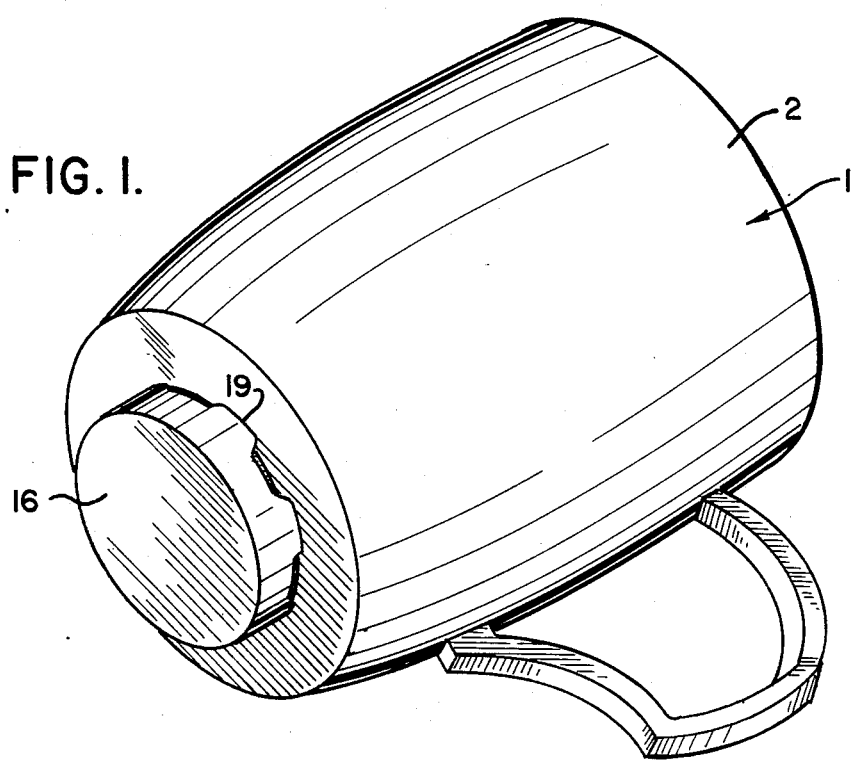
FIG. 1.
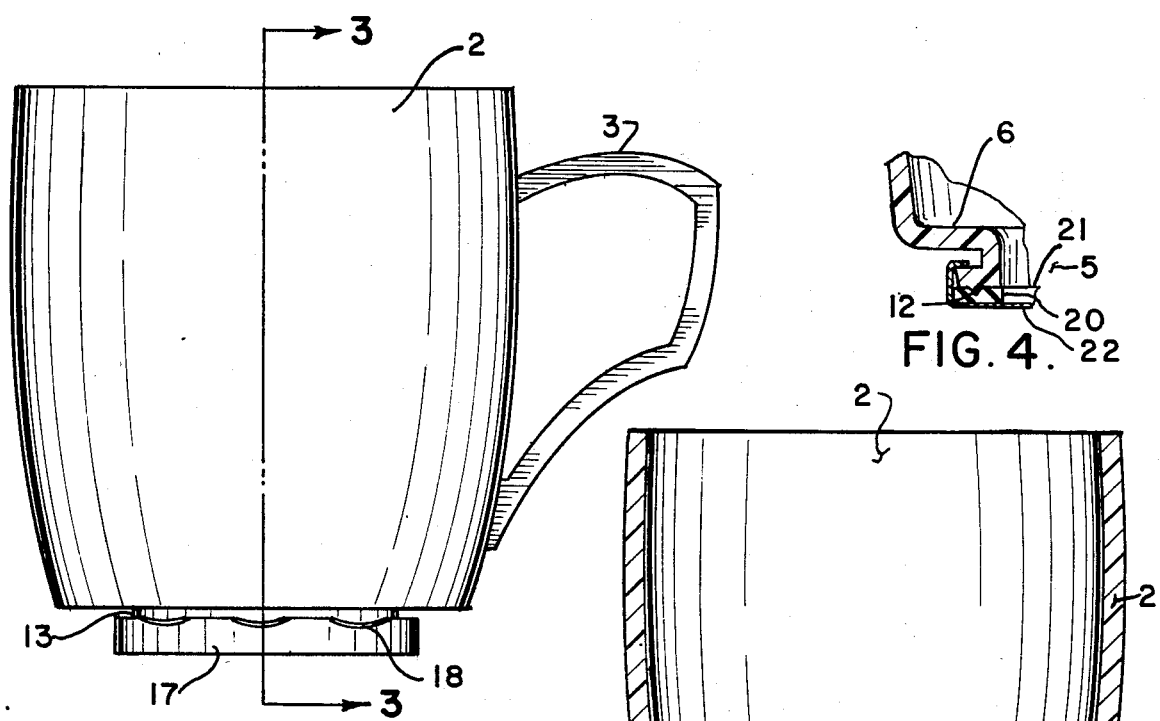
FIG. 2.
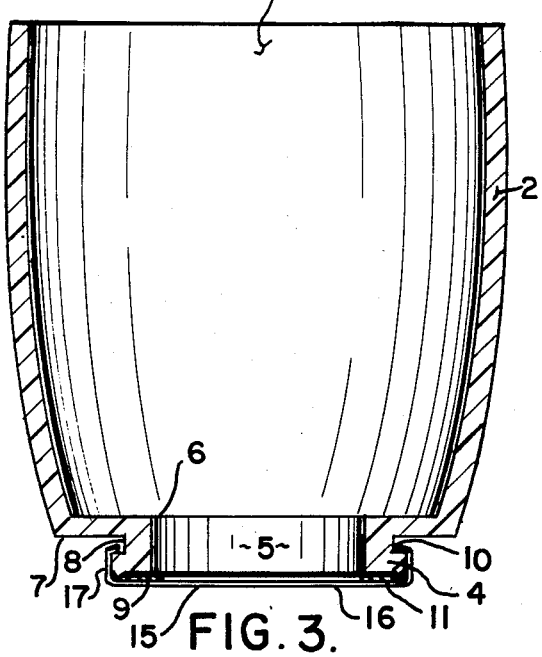
FIG. 4.
FIG. 3.

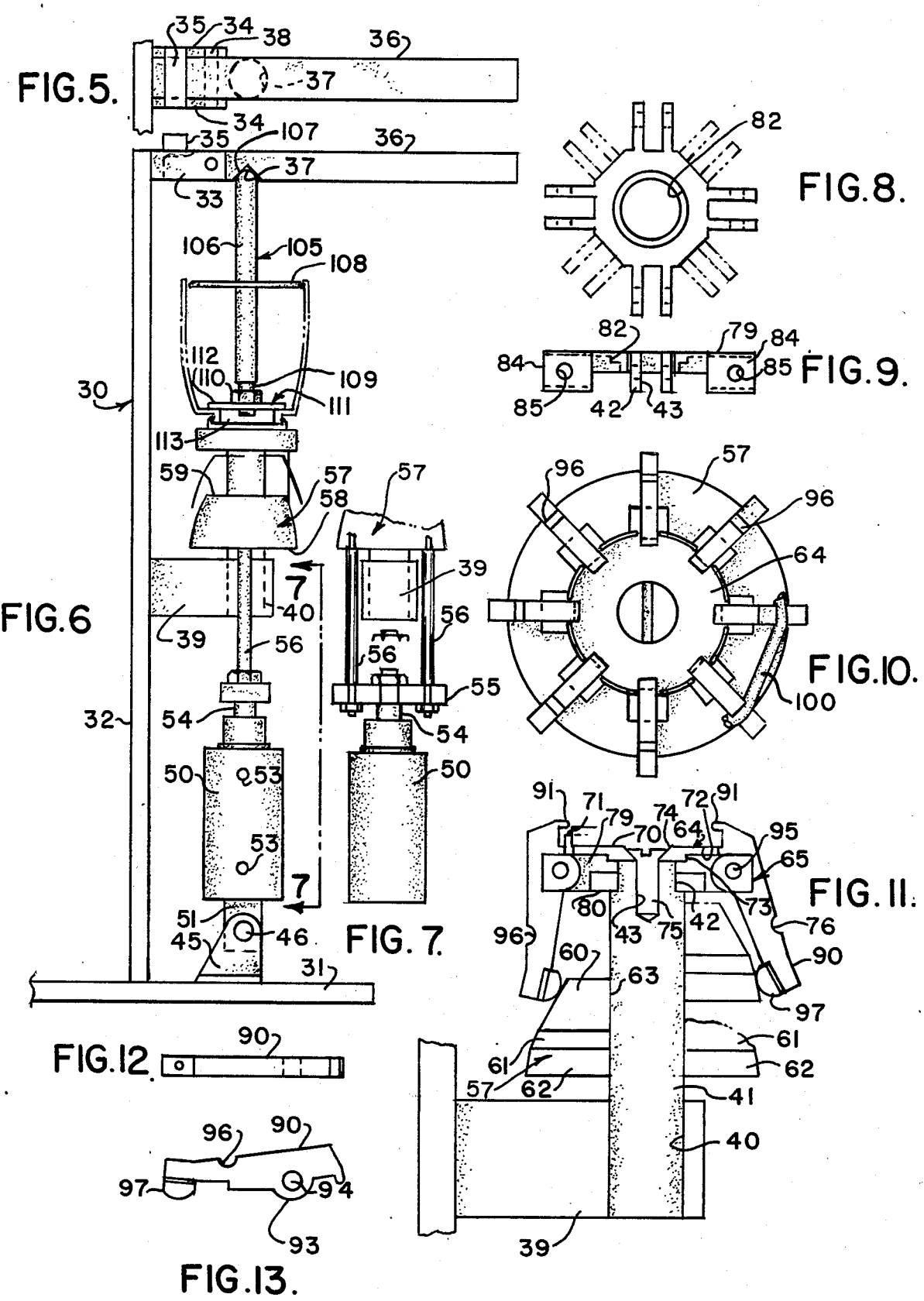

CUP AND APPARATUS AND METHOD FOR MAKING IT

This is a continuation of application Ser. No. 415,396, filed Sept. 7, 1982 now abandoned.

BACKGROUND OF THE INVENTION

The cup of this invention is particularly adapted to use with the heating units of the types shown and described in U.S. Pat. Nos. 3,876,861 and 4,160,152, but its utility is not confined to that use. It is desirable for both economic and esthetic reasons to be able to use a moderate temperature, inexpensive plastic such as polypropylene to make cups. However, when a heat conductive stainless steel closure is to be used to cover and seal an opening in the bottom of the cup, so as to provide better heat transfer through the bottom, the use of plastic such as polypropylene poses a problem. The plastic has a high coefficient of expansion as compared with the metal. Furthermore, it tends to take a permanent set, particularly when it is confined near the outer limit of its expansion, and then to contract upon cooling so that a tight circumferential fit between the plastic and the metal becomes progressively looser as the plastic first sets at its outer limit and then contracts inwardly. With the construction of this invention, a moderate temperature, relatively inexpensive plastic can be used to produce a cup with a stainless steel bottom closure sealed and accomodated for differences in expansion and contraction by a thin, e.g. 20 mil, silicone gasket.

One of the objects of this invention is to provide a cup with a plastic body and a metal base closure which will remain liquid-tight after repeated heating and cooling.

Another object is to provide method and apparatus for producing such a cup simply, economically and effectively.

Other objects will become apparent to those skilled in the art in the light of the following description and accompanying drawing.

SUMMARY OF THE INVENTION

In accordance with this invention generally stated a cup adapted to use with a warming unit is provided having a plastic body with an open mouth and a base part defining a central opening. The base part has a radially outwardly extending flange around it with axially spaced radially extending generally planar upper and lower surfaces and a continuous rib projecting in a generally axial direction from the lower surface. A metal base closure, of a metal having a lower coefficient of expansion than the plastic, extends continuously over the opening and beyond the radially outer edge of the flange. An annular gasket is mounted between the closure and lower surface of the flange and in continuous engagement with the rib. The closure has a rim staked at spaced areas around its perimeter over the upper radially extending flange surface a distance greater than any anticipated distance of contraction or expansion of the flange relative to the closure upon repeated cycling of heating and cooling.

In making the cup, the gasket is mounted in the bottom closure, the cup is mounted on top of the gasket within the rim of the closure and the rim of the closure is staked simultaneously over the flange at a multiplicity of generally equispaced locations.

The apparatus for forming the cup includes a cup-supporting platform, staking arms pivotally mounted at stations around the platform, a cam mounted for movement toward and away from the platform, means for moving the cam, preferably in the form of a pneumatic cylinder, and a seperate central support for the cup during assembly. The staking arms have at one end a staking finger projecting toward the cup platform, and at another end a cam follower that is engaged by the cam as it travels.

BRIEF DESCRIPTION OF THE DRAWINGS

In the drawing, FIG. 1 is a view in perspective of a cup of this invention;

FIG. 2 is a view in side elevation of the cup of FIG. 1;

FIG. 3 is a sectional view taken along the line 3—3 of FIG. 2;

FIG. 4 is a fragmentary sectional view of a portion of the bottom of the cup without the bottom closure;

FIG. 5 is a top plan view, partly broken away, of the upper portion of one embodiment of apparatus of this invention;

FIG. 6 is a view in side elevation, also partly broken away, and with a cup shown in phantom lines, of the apparatus of FIG. 5, with staking arms omitted for clarity;

FIG. 7 is a fragmentary view in front elevation in the direction indicated by line 7—7 of FIG. 6;

FIG. 8 is a top plan view of a staker arm fixture plate, with knuckles of another staker arm fixture plate, making up the complete staker arm fixture, shown in phantom lines;

FIG. 9 is a view in side elevation of the staker arm fixture plate of FIG. 8;

FIG. 10 is a top plan view of the cup stand and staker arm fixture assembly, with a helical spring shown fragmentarily;

FIG. 11 is a fragmentary view in side elevation of the cup stand, staker arm fixture, support bar and column, and cam of the previous figures;

FIG. 12 is a view in edge elevation of a staker arm; and

FIG. 13 is a view in side elevation of the staker arm shown in FIG. 12.

DESCRIPTION OF THE PREFERRED EMBODIMENT

Referring now to the drawing for one illustrative embodiment of this invention, and particularly to FIGS. 1 through 4, refefence numeral 1 indicates a cup body made, in this embodiment, of polypropylene. The temperature drop between the cup bottom closure, when exposed to a heating element, and the cup body, with the construction of this invention permits the use of such a medium temperature plastic. The cup body 1 has a side wall 2 with which a handle 3 is integral, and a base part 4. The base part 4 defines an opening 5, which is surrounded by an interior ledge 6 that has a corresponding external generally radially extending surface 7. The base part includes a neck 8 at the lower end of which is a radially outwardly extending annular foot or flange 9. The flange 9 has a radially extending substantially planar upper surface 10, which, with the section 7 and neck 8, defines a channel 13, and a radially extending substantially planar lower surface 11. A continuous, annular rib 12, triangular in transverse cross section, as shown in FIG. 4, projects with its apex downward from the lower surface 11, spaced inboardly from the outer edge of the surface 11.

A bottom closure 15 has a continuous bottom wall 16 and a rim 17. The rim 17 is staked at its upper edge over the upper surface 10 of the flange 9 at substantially equispaced areas around its perimeter, giving a somewhat crenelated appearance, with crenels 18 and merlons 19.

An annular gasket 20, with a flat top surface 21 and a flat bottom surface 22 is mounted closely within the compass of the rim 17, between the upper surface of the bottom wall of the bottom closure and the lower surface of the flange 9. The gasket is preferably made of FDA approved silicone rubber. The apex of the triangular rib 12 is pressed into the top surface 21 of the gasket, and the lower surface of the flange 9 and the upper surface of the gasket are in tight engagement.

The provision of the radially extending substantially planar upper surface 10 is a matter of importance. If, for example, the periphery of the flange is beveled convergently upwardly, and the rim staked over the beveled surface, when the plastic contracts radially with respect to the rim, the rim becomes loose.

Referring now to FIGS. 5 through 13, reference numeral 30 indicates one embodiment of staking machine of this invention. The machine 30 has a base 31 and an upright stanchion 32 fastened to and supported by the base. At the upper end of the stanchion 32, a yoke 33 is secured to the stanchion at one end. The yoke in this embodiment consists of a pair of leaves 34 bridged by a stop 35 that serves as a reinforcing bar as well. A lever 36 is hinged on a pintle 38 carried by and between the leaves 34. A sufficient length of the lever 36 extends beyond the pintle 38 in the direction of the stanchion to extend beneath the stop 35, upon which that end of the lever bears to keep the lever from swinging down into the way. The lever 36 has on its undersurface a locating socket 37.

Intermediate the height of the stanchion 32, and extending in the same direction as the yoke 33, is a support bar 39 with a vertical bore 40 near its outer end, in which a bearing and stand support column 41 is fixedly mounted. The column 41 has a reduced top section 42 and an internally threaded central blind hole 43 extending vertically downwardly from its upper end, through which it opens. A base clevis 45 is mounted on the base, with a horizontal clevis pin 46 a perpendicular to the axis of which is aligned with the axis of the bore 40 and the center of the socket 37.

A pneumatic cylinder 50 has a tailpiece 51 pivotally mounted on the clevis pin 46. The cylinder 50 has the standard pressure and exhaust fittings 53, and a piston rod 54 projecting from the cylinder vertically upwardly. The piston rod 54 carries a head plate 55 on which two drive rods 56 are mounted on diametrically opposite sides. The drive rods 56 are spaced from and straddle the support bar 39, and are mounted at their upper ends in and carry a cam block 57. The cam block 57 is circular in top plan and has a flat bottom surface 58 and a flat top surface 59. Between the top and bottom surfaces, the cam block has side cam surfaces formed at three different angles from the vertical. An upper cam surface 60 in this embodiment has a 30° angle from the vertical; an intermediate cam surface 61, 15°, and a lower cam surface 62, 10°. The cam block has a central bearing channel 63 closely but slidably embracing the column 41 above the support bar 39.

A cup stand or platform 64 and staker arm fixture 65 are mounted on the upper end of the column 41, as shown particularly in FIG. 11. The cup stand has a top surface 70, an interrupted rim 71, a bottom surface 72 and a collar or boss 73 projecting downwardly from the bottom surface 72 at the center of the stand, through which a countersunk hole 74 extends to receive the head of a machine screw 75 threaded into the hole 43 in the column 41.

The staker arm fixture 65 in this embodiment is made up of a top stake arm fixture plate 79, octagonal in plan, and a bottom staker arm fixture plate 80, identical with the top plate 79 except that the top plate 79 is provided with a counterbore 82 to receive the collar 73 of the cup stand. Both the bottom and top plates have four pairs of flat sided knuckles 84 projecting at quadrants, flush with a contiguous surface of the plate on one side and projecting from the plane of the plate on the other. All of the knuckles have pintle holes 85 with their axes in the plane of the side of the plate from which the knuckles project. The bottom plate 80 is inverted with respect to the top plate 79 and rotated 45°, so that knuckles 84 of the bottom plate are intermediate the knuckles 84 of the top plate, as indicated in FIG. 8 and shown in FIG. 10, and the center lines of the knuckle holes of both plates are in the same plane.

Each of staker arms 90 has a staking finger 91 at its upper end, a hinge section 93 intermediate its ends through which a hinge pin hole 94 extends, a spring seating channel 96 and, at its lower end, a cam follower 97. The arms 90 are mounted on the knuckles 84 by pins 95, and are biased to move the cam followers 97 inboardly by a coil spring 100 seated in the channels 96.

A cup clamp or central support 105 in this embodiment is made up of a post 106 with a rounded head end 107 dimensioned to seat in the socket 37, a locating disc 108 mounted intermediate the height of the post and dimensioned to fit closely within the open upper mouth of the cup, a reduced, externally threaded section 109 and a clamp body 111 into which the threaded section 109 is threadedly mounted. A nut 110 on the threaded section 109 above the clamp body 111, serves to hold the clamp body in its desired adjusted position. The clamp body has a cup ledge-engaging flange 112 and a pilot boss 113 sized to provide a slip fit in the opening 5 in the cup, and to stop short of the plane of the lower surface 11 of the flange 9, when the flange 112 of the clamp body engages the surface of the ledge 6 of the cup. The cup clamp is essential to the forming of the cup, serving to locate and support the cup body and to press the rib 12 into indenting engagement with the gasket.

In assembling the cup, a bottom closure 15 is placed on the cup stand, within the ambit of the locating rim 71, with the rim 17 of the closure facing upwardly. The gasket 20 is mounted in the closure, a cup body is placed with its flange within the ambit of the rim, the cup clamp is inserted as shown, in FIG. 6, and the lever 36, which has been raised to permit the insertion of the cup clamp, is lowered to locate the top of the cup clamp and to exert a desired amount of downward pressure of the cup body flange surface on the gasket. The rim of the closure projects above the upper surface of the flange. Compressed air, in this embodiment, is admitted to the lower end of the cylinder 50, causing the piston 54, hence the cam block 57, to move toward the cup stand. The cam surfaces 60, 61 and 62 progressively and simultaneously engage the cam followers 97 of the staking arms 90. The engagement of the cam followers 97 and the continued movement of the cam block forces the arms 90, against the bias of the spring 100, to rock the arms about the pins 95, causing the staking fingers 91 to move radially inwardly against the upper part of the rim 17, staking the rim at eight places simultaneously over the upper surface 10 of the flange 9. The dimensions of the rim and the staking fingers 91 are such that the distance that the resulting crenels overlap the upper surface 10 is greater than any anticipated contraction of the flange. The pressure applied to the cup by the lever 36 acting through the clamp 105 is sufficient to embed the rib 12 in the upper surface of the gasket 20 so that the rest of the surface of the gasket is tight against the lower surface 11 of the flange 9. The amount of contraction of the plastic in the axial direction is slight compared with the contraction in the radial direction, so that the rib 12 can be made short.

Merely by way of illustration, in a cup in which the inside diameter of the open mouth is approximately 3" and the cup body wall is approximately 0.125" thick, the outside diameter of the neck 8 can be 1.75" and its inside diameter (the diameter of the opening 5) 1.50", and the diameter of the flange at the upper surface 10, 1.95". The height of the flange is the thickness of the body wall, in this instance, 0.125". The rib 12 can project 0.010" from the lower surface 11, and be located about 0.12" from the outer edge of the lower surface 11. In the preferred embodiment, the side surface of the flange 9 slopes slightly outwardly upwardly between the lower surface 11 and upper surface 10, for example at 5°, and the gasket, fitting easily but closely within the ambit of the rim of the closure, extends a short distance beyond the perimeter of the lower surface 11. The gasket 20 can be 0.02" thick and 0.45" wide, and the rim of the bottom closure, 1.96" in inside diameter, and 0.27" high above the upper surface of the bottom closure. Under these circumstances, the engagement of the upper surface of the flange by the under surface of the crenels extends inboardly about 0.06" from the outer edge of the upper surface of the flange.

Again, merely by way of illustration, the staking machine base can be about 9" long, the stanchion 32 being mounted about 2½" from the remote end of the base and extending about 21.30" above the upper surface of the base. The lower surface of the support bar 39 is 9.30" above the top of the base and the bar is 1.50" high. The shoulder of the support column 41 on which the bottom staker arm fixture plate 80 rests is 2.75" above the top surface of the bar 39. The cylinder provides a 1" stroke for the piston rod 54. The height of the rim 71 is 0.15", and the rim is interrupted to provide gaps sufficiently wide to permit the upper ends of the arms 90 to move in. The cam block 57 can be 1.25" high between the bottom surface 58 and top surface 59 and 3" in diameter at the bottom surface. The support bar 39 can be 1" in diameter and the bearing channel 63 only slightly larger. The diameter of the cam block at the top surface can be 2.10". The axial height of the cam surface 60 can be 0.50", of the intermediate side surface 61, 0.30", and of the lower cam surface 62, 0.45". As has been described above, the cam side surface 60 slopes at 30° from the vertical, the intermediate surface 61 at 15°, and the lower surface 62, at 10°, causing the fingers 91 to move in rapidly and thereafter in two additional stages, more slowly but with greater force through the 1" stroke. As can be seen in FIG. 11, where the cam is shown in both its lowermost and uppermost positions, the cam followers are biased to rest on the surface 60, with the line of contact about 0.125" below the top surface 59.

Numerous variations in the construction of the cup and apparatus and the performance of the method, within the scope of the appended claims will occur to those skilled in the art in the light of the foregoing disclosure. Merely by way of example, the dimensions of the cup can be varied. The cup can be made of various other plastic materials such as polyethylene. The gasket can be made of other materials, as long as they have FDA approval and contribute no taste or odor to the contents of the cup. The top surface 21 of the gasket can be provided with a molded annular rib and the lower surface 11 of the flange 9 be made planar, although the provision of the rib 12 on the bottom has advantages. The metal of which the bottom closure is made can be different from stainless steel, although stainless steel is preferred for a number of reasons. The number of staking arms can be increased or decreased. The rim of the bottom closure can be interrupted by slots to facilitate its being staked, but such an arrangement not only requires another operation in the forming of the closure, but its being oriented in a particular way when it is to be staked. The upper surface of the flange of the cup body can be sloped slightly downwardly radially inwardly, but that poses problems in the molding and makes the provision of constant contact between the staked over rim and the uppper surface of the flange more difficult than the use of a planar radial surface. The pneumatic cylinder 50 can be replaced with a hydraulic cylinder or an electrical solenoid, or even a mechanical mechanism. The cup clamp 105 can be operated by a pneumatic, hydraulic or mechanical actuator rather than being put into place manually. Similarly, the loading of the cup components and the operation of the staking device can be automated, if the volume of production warrants it. These are merely illustrative.

I claim:

1. A cup adapted to use with a warming unit, comprising a plastic body having an open mouth and a base part defining an opening, a radially outwardly extending flange around said base part, said flange having axially spaced, radially extending upper and lower planar surfaces substantially parallel to one another, a metal base closure of a metal having a lower coefficient of expansion than said plastic, said closure having a bottom wall and a rim around said bottom wall and extending higher than the upper surface of the said flange, said closure bottom wall extending continuously over said opening and beyond a radially outer edge of said flange parallel with said body flange lower radial planar surface, and an annular gasket between and in engagement with an upper surface of the bottom wall of said closure and said lower surface of said flange, said closure rim having staked over portions around its upper edge engaging said upper radially extending flange surface, the staked over portions thereof that engage said upper radially extending surface defining a plane substantially parallel with said bottom wall along said gasket and extending over said upper surface of said flange a distance greater than any anticipated distance of contraction or expansion of said flange relative to said staked portion of said closure rim upon repeated cycling of heating and cooling whereby said plastic flange can move radially, sandwiched between said bottom wall and said staked over portions, while maintaining its dimensional integrity axially between said bottom wall and said staked over portions.

2. The cup of claim 1 wherein the said closure is staked at a multiplicity of places around its periphery, said places being generally equispaced.

3. The cup of claim 1 wherein the body is of polypropylene and the closure is of stainless steel.

4. The cup of claim 1 wherein said flange lower surface has a continuous rib projecting downwardly from said lower surface, said rib engaging said gasket intermediate the width of said gasket.

5. The cup of claim 1 wherein the body has a generally radially extending overhang above said flange, defining with said flange a channel into which said closure is staked.

6. The cup of claim 1 wherein the gasket has parallel flat top and bottom surfaces extending radially outwardly beyond the radially outer edge of the contiguous surface of the flange.

7. The cup of claim 1 wherein the lower surface of the flange has a continuous rib projecting in a generally axial direction from said lower surface, said rib being in continuous engagement with an upper surface of said gasket.

* * * * *